US012754091B2

(12) United States Patent
Ozmen et al.

(10) Patent No.: US 12,754,091 B2
(45) Date of Patent: Oct. 6, 2026

(54) MULTI-CHANNEL PRESSURE SCANNING VALVE FOR PRESSURE MEASUREMENT

(71) Applicant: KARADENIZ TEKNIK UNIVERSITESI TEKNOLOJI TRANSFERI UYGULAMA VE ARASTIRMA MERKEZI MUDURLUGU, Trabzon (TR)

(72) Inventors: Yucel Ozmen, Trabzon (TR); Ertan Baydar, Trabzon (TR)

(73) Assignee: KARADENIZ TEKNIK UNIVERSITESI TEKNOLOJI TRANSFERI UYGULAMA VE ARATIRMA MERKEZI MUDURLUGU, Trabzon (TR)

( * ) Notice: Subject to any disclaimer, the term of this patent is extended or adjusted under 35 U.S.C. 154(b) by 274 days.

(21) Appl. No.: 18/834,631

(22) PCT Filed: Dec. 20, 2023

(86) PCT No.: PCT/TR2023/051599
§ 371 (c)(1),
(2) Date: Jul. 31, 2024

(87) PCT Pub. No.: WO2024/136819
PCT Pub. Date: Jun. 27, 2024

(65) Prior Publication Data

US 2025/0155308 A1 May 15, 2025

(30) Foreign Application Priority Data

Dec. 20, 2022 (TR) ............................... 2022/019833

(51) Int. Cl.
*G01L 19/00* (2006.01)
*F16K 11/076* (2006.01)

(52) U.S. Cl.
CPC ........ *G01L 19/0015* (2013.01); *F16K 11/076* (2013.01)

(58) Field of Classification Search
CPC ........................... G01L 19/0015; F16K 11/076
USPC ........................................................... 73/756
See application file for complete search history.

(56) References Cited

U.S. PATENT DOCUMENTS

| | | | | |
|---|---|---|---|---|
| 9,841,340 | B1 * | 12/2017 | Harthan | G01M 9/06 |
| 2015/0354607 | A1 * | 12/2015 | Avni | B60K 6/543 60/428 |

FOREIGN PATENT DOCUMENTS

| | | | |
|---|---|---|---|
| CN | 104267621 | A | 1/2015 |
| CN | 204758196 | U | 11/2015 |
| CN | 106370345 | A | 2/2017 |
| CN | 108733110 | A | 11/2018 |

(Continued)

*Primary Examiner* — Peter J Macchiarolo
*Assistant Examiner* — Rodney T Frank
(74) *Attorney, Agent, or Firm* — Bayramoglu Law Offices LLC

(57) ABSTRACT

A multi-channel pressure scanning valve allows real-time measurement of multiple pressure signals to be easily carried out with a single valve in cases where pressure must be measured from different points in fluid mechanics, aerodynamics, etc. studies. The multi-channel pressure scanning valve includes: pressure tubes, a front flange, a ball, a ball spring, pressure transmission channels, a plexiglass disc, a pressure measurement tube, a rear flange, a nut, a nut slot, a ball channel, and a pressure measurement channel.

1 Claim, 4 Drawing Sheets

(56) References Cited

FOREIGN PATENT DOCUMENTS

| | | | |
|---|---|---|---|
| CN | 214471479 | U | 10/2021 |
| CN | 114777992 | A | 7/2022 |
| EP | 1146327 | A2 | 10/2001 |

* cited by examiner

MULTI-CHANNEL PRESSURE SCANNING VALVE FOR PRESSURE MEASUREMENT

CROSS REFERENCE TO THE RELATED APPLICATIONS

This application is the national phase entry of International Application No. PCT/TR2023/051599, filed on Dec. 20, 2023, which is based upon and claims priority to Turkish Patent Application No. 2022/019833, filed on Dec. 20, 2022, the entire contents of which are incorporated herein by reference.

TECHNICAL FIELD

The invention relates to a multi-channel pressure scanning valve that allows real-time measurement of multiple pressure signals to be easily carried out with a single valve in cases where pressure must be measured from different points in fluid mechanics, aerodynamics, etc. studies.

BACKGROUND

Pressure scanning valves are sensing devices that enable real-time measurement of multiple pressure signals. It is widely used in studies in the field of aerodynamics of fluid mechanics, wind tunnel systems, engine driving systems, and experimental studies within the scope of building aerodynamics. Experimental studies within the scope of building aerodynamics are carried out by placing a scaled-down of the building model to be examined on the base of the wind tunnel test section and generally measuring the pressure on the model surfaces with advanced pressure measurement systems. In wind tunnel studies in the field of building aerodynamics, surface pressure measurements are carried out at many points on the surfaces of the model placed at the base of the tunnel test section. In the development stage of various aircraft, the multi-channel pressure scanning valve can be used to accurately obtain and verify the aerodynamic distribution and pressure of various parts of the engine during the flight of the aircraft. In the studies, the pressure effect carried by tubes from dozens of pressure probes placed on the model surfaces is transmitted to a single pressure measurement device and the pressure value of the relevant point is measured and connected to the pressure sensor device by connecting and removing the corresponding tube, and this causes loss of time. Instead of this application, the tubes to which many pressure probes formed on the model surfaces are connected to the pressure tubes arranged circumferentially on the disc at the entrance of the pressure scanner, the schematic of which is shown below. In the Chinese utility model document numbered CN214471479U, which is in the state of the art, multi-channel pressure scanning valve is mentioned. This multi-channel pressure sweep valve consists of an outer cover, a bottom cover plate, and a separation plate in the outer cover. A plurality of pressure sensors are built into the separation plate. A signal conditioning plate, electrically connected to the pressure sensors, is detachably mounted on the partition plate. Pressure measurements taken independently for each channel are converted into electrical signals.

In the Chinese patent document numbered CN106370345A, which is in the state of the art, multi-channel pressure scanning valve is mentioned. Said pressure scanning valve includes a housing, a cover plate and a plurality of pressure sensors. Each pressure sensor includes a pressure routing connector, a pressure-sensitive chip, and a signal conditioning plate. The pressure diverting connector can be arranged in a hermetically separable manner on the housing. Each channel has a pressure measurement sensor and each sensor measures pressure values from the channel to which it is connected.

In the United States patent document numbered U.S. Pat. No. 9,841,340B1, which is in the state of the art, pressure measurement apparatus, mechanisms and methods are mentioned. The pressure sensor assembly includes a substrate, a first adhesive member adhered to the substrate, a sensor support adhered to the first adhesive member, a second adhesive element adhered to the sensor support, and a pressure sensor adhered to the second adhesive element and aligned with the openings. Said pressure measurement device scans and measures pressure through multiple input channels.

Measured analog values are converted to digital and reflected on the screen.

In the Chinese patent document numbered CN108733110A, which is in the state of the art, the multi-channel temperature and pressure data acquisition system and its working method are mentioned. The device belonging to the mentioned multi-channel temperature and pressure data acquisition system is connected to the thermometer rod to collect the temperature signal. Values are measured with a temperature meter and pressure meter placed at each inlet.

In the Chinese utility model document numbered CN204758196U, which is in the state of the art, a portable multi-channel pressure measurement system is mentioned. This system includes the housing, a plurality of single-channel modules, and the data acquisition station of the setting in the housing. This system measures the difference by comparing the pressure values taken from multiple points with the predetermined reference pressure value.

However, the pressure measurement valves in the sample patent documents do not contain a ball structure, and it is not possible to ensure that the channels fit into the measurement center by rotating this structure. In the known state of the art, there is no multi-channel pressure scanning valve for pressure measurement, which has multiple channels and allows these channels to be placed in the measurement center by rotating a ball structure. Therefore, there was a need to develop a multi-channel pressure scanning valve for the pressure measurement of the invention.

SUMMARY

The purpose of this invention is to realize a multi-channel pressure scanning valve for pressure measurement in a way that allows the channels to be placed in the measurement center and easy measurement by rotating a ball structure it contains in case the pressure is measured from many points.

BRIEF DESCRIPTION OF THE DRAWINGS

A multi-channel pressure scanning valve for pressure measurement carried out to achieve the objectives of this invention is shown in the attached figures.

These figures are.

The parts in the figures are numbered one by one, and the corresponding numbers are given below.

Figure 1:
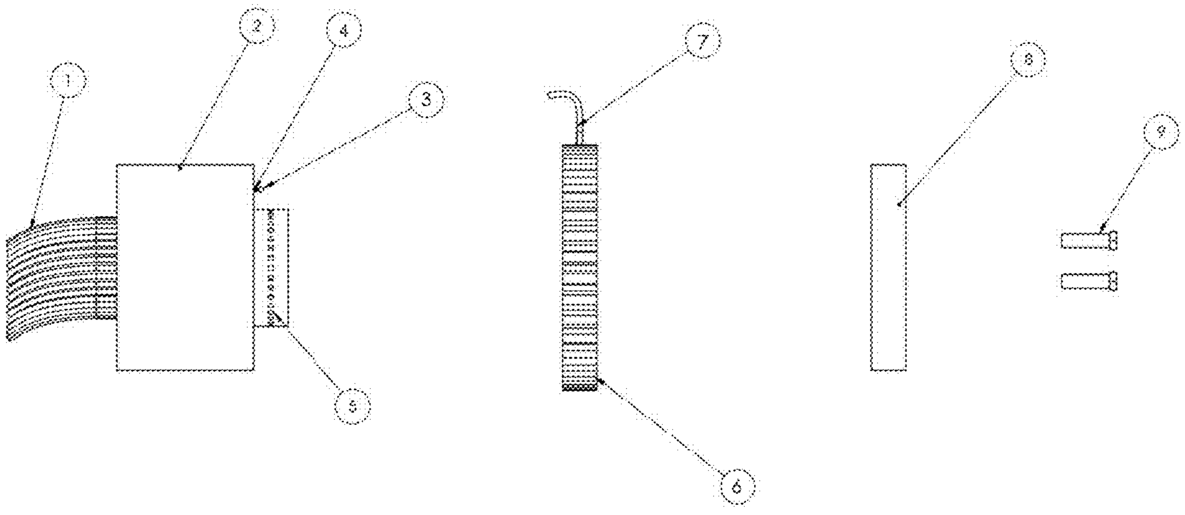
FIG. 1 is a schematic view of the multi-channel pressure scanning valve developed for pressure measurement.
Figure 2:
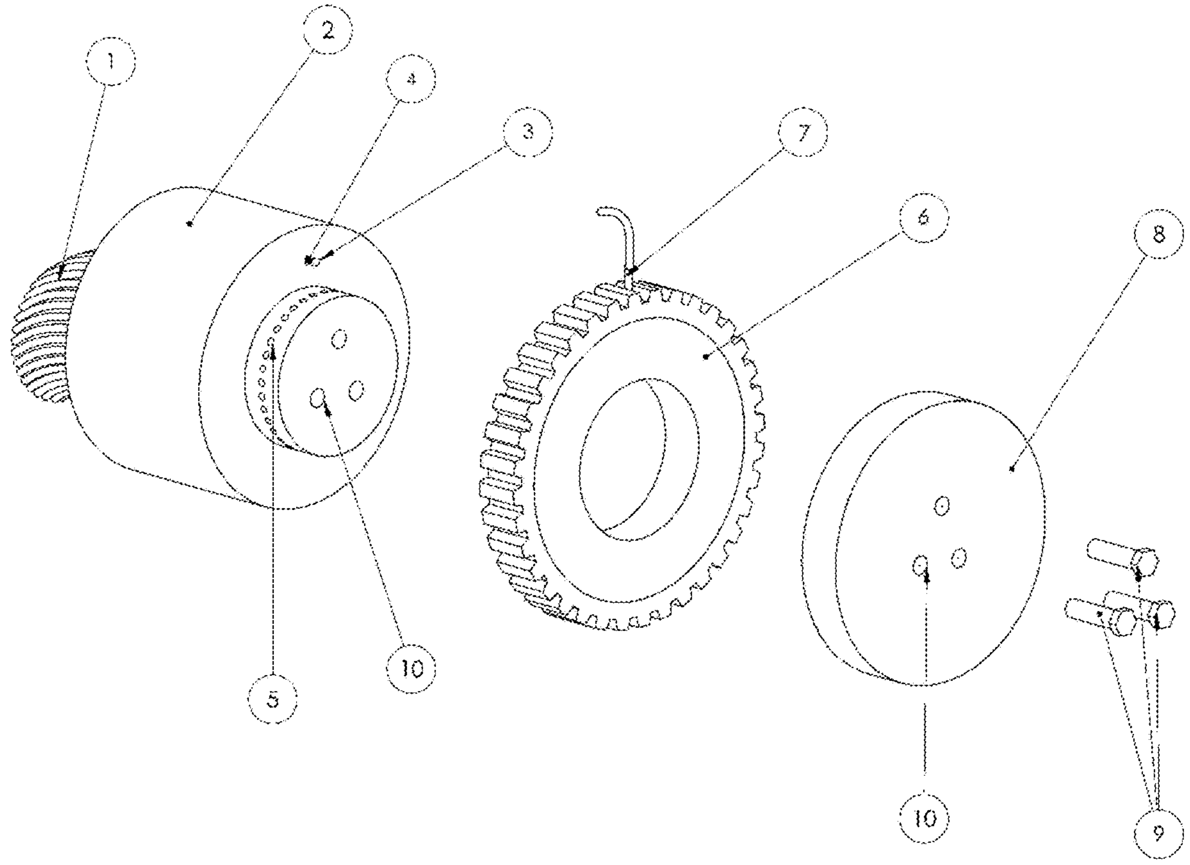
FIG. 2 is a schematic perspective view of the multi-channel pressure scanning valve developed for pressure measurement.
Figure 3:
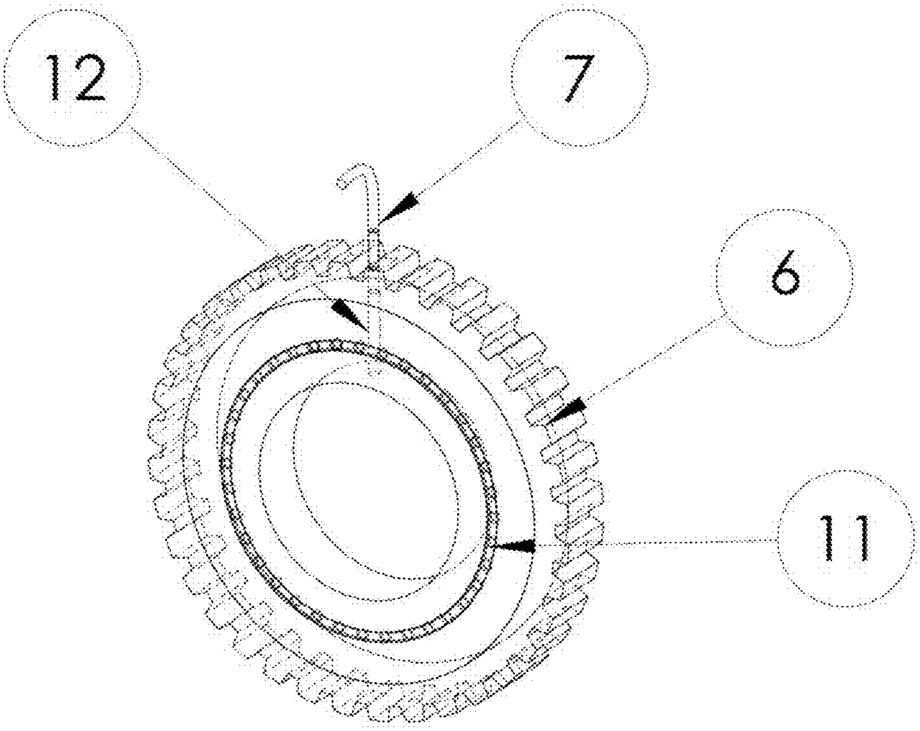
FIG. 3 is a schematic perspective view from a different angle of the multi-channel pressure scanning valve developed for pressure measurement.
Figure 4:
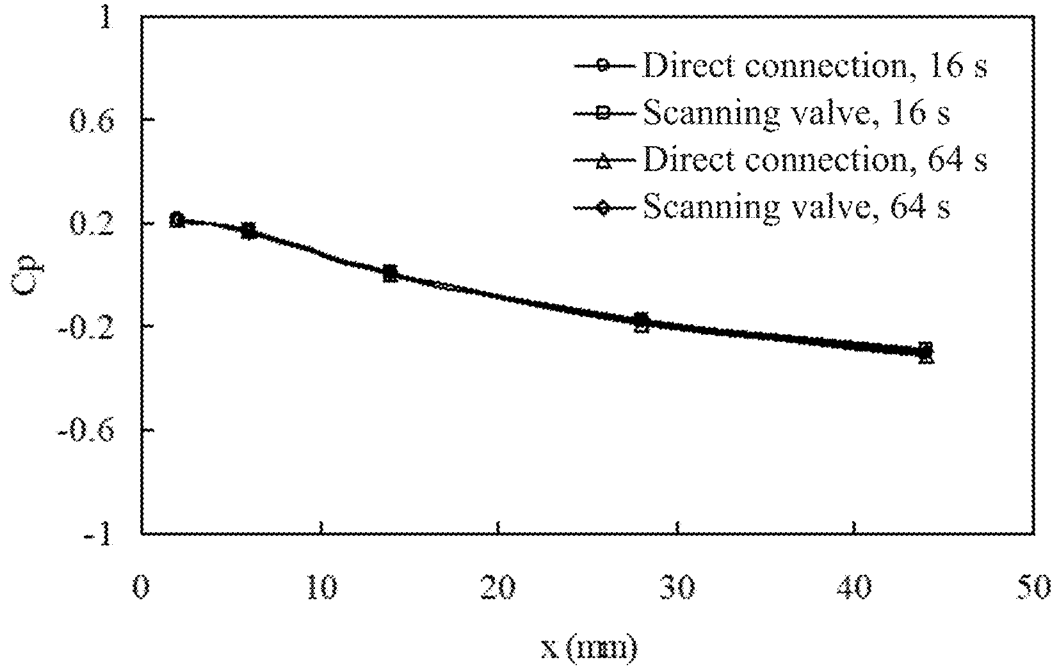
FIG. 4 is a graph showing the pressure loss when the pressure tubes are connected directly to the pressure measurement device and the pressure scanning valve.

13. Pressure tubes
14. Front Flange
15. Ball
16. Ball spring
17. Pressure transmission channels
18. Plexiglas disc
19. Pressure measurement tube
20. Rear flange
21. Nut set
22. Nut
23. Ball slot
24. Pressure measurement channel

DETAILED DESCRIPTION OF THE EMBODIMENTS

The invention is a multi-channel pressure scanning valve for pressure measurement; comprising

- pressure tubes (1) that transmit the pressure effect from pressure probes placed at points where pressure is to be measured,
- a front flange (2) to which the pressure tubes (1) are connected and which enables pressure to be transmitted,
- a ball (3) placed on the front face of the front flange (2), which will allow the pressure effect of the pressure tubes (1) to be shifted by 90°,
- a ball spring (3) positioned on the front face of the front flange (2), where the ball (3) is to be positioned,
- pressure transmission channels (5) on the front flange (2), which transmit the pressure effect,
- a plexiglass disc (6) rotatably mounted on the front flange (2), which by means of its rotating movement ensures that only the pressure effect from one pressure tube (1) is transmitted,
- a pressure measurement tube (7) on the plexiglass disc (6), which allows the pressure to be transmitted to the pressure measurement device for measuring the pressure,
- a rear flange (8) for fixing the front flange (2) and the plexiglass disc (6),
- a nut (9) connected to the rear flange (8) and securing the rear flange (8),
- a nut slot (10) located on the front flange (2) and the rear flange (8) where the nuts (9) are to be installed,
- a ball slot (11) located on the lateral surface of the plexiglass disc (6), which will move as a result of the rotational movement,
- a pressure measurement channel (12) to which the pressure measurement tube (7) located on the lateral surface of the plexiglass disc (6) is connected.

There are pressure tubes (1) connected to many pressure probes on the front flange (2) of the developed pressure scanner valve. By rotating the plexiglass disk (6) located in the middle section of the pressure scanner valve, the ball (3) positioned with the ball spring (4) moves forward in the peripheral ball slots (11) opened on the lateral surface of the plexiglass disk (6). The pressure effect carried by the pressure tubes (1) connected to the front flange (2) is transmitted to the pressure channel in the plexiglass disc (6) through the pressure transmission channels (5). With the rotation movement on the plexiglass disk (6), the ball (3) passes to the next ball slot (11), and thus the pressure effect of the next one from the numerous pressure tubes (1) located on the front flange (2) changes direction by 90° and moves to the plexiglass disk (6). The pressure is reflected on the pressure measurement device through the pressure measurement tube (7) connected to the pressure measurement channel (12). The pressure effect coming from a large number of pressure tubes (1) is reflected to the pressure scanner by connecting it to the circumferentially arranged pipes on the lateral surface of each tube inlet disk. By rotating the plexiglass disk (6) step by step, the effect of a different tube at each rotation stage is reflected on the plexiglass disk (6). It is possible to reach the pressure measurement device by matching it with the field pressure measurement tube (7). Thanks to the rear flange (8) located at the back of the developed pressure scanner valve, the front flange (2) and the plexiglass disc (6) are fixed. In order to fix the rear flange (8), there are nut slots (10) on the surface of the front flange (2) and the rear flange. The pressure scanner valve developed by fixing the nuts (9) to these nut slots (10) forms a whole. Thanks to the developed pressure scanner valve, it is possible to easily measure the pressure of many points with a single pressure measurement device instead of using as many devices as the number of measurement points.

As an example application of the multi-channel pressure scanning valve for pressure measurement, which eliminates the difficulty of connecting each pressure tube (1) to the pressure sensor separately, it is designed with channels so that 36 and 48 pressure tubes (1) can be connected. This number can be increased or decreased. Special brass material was used due to its advantage in sealing. The points where pressure measurement will be made are connected to the valve with the pressure tube (1) and the pressure measurement is transmitted to the device through a single outlet. By moving the rotating mechanism on the screening valve, each of the pressure tubes (1) connected to the channels at the inlet are matched with the outlet respectively. In order to investigate whether the use of the pressure scanner system creates an additional pressure loss, measurements were taken for each tube in turn by connecting it directly to the pressure measurement device without a pressure scanner. Then, the tubes representing the same measurement points were connected to the pressure scanner and the measurements were repeated by gradually rotating the pressure scanner and reflecting the pressure effect carried in the tubes to the device. As a result of the measurements, it was determined that no additional pressure loss occurred. Thanks to the ball (3) located inside the Plexiglas disc (6), measurements can be made from the space corresponding to the pressure tube (1).

The advantages obtained with the developed multi-channel pressure scanning valve for pressure measurement are listed below.

- In cases where pressure needs to be measured at more than one point, a single pressure gauge can be used with a multi-channel pressure scanning valve instead of using separate pressure gauges.
- It eliminates the difficulty of connecting each pressure tube (1) separately to the pressure sensor.
- The developed multi-channel pressure screening valve, thanks to the ball (3) and rotatable plexiglass disc (6) section it contains, transfers the pressure from many pressure tubes (1) located on the front flange (2) to the pressure pipe located on the plexiglass disc (6) that can rotate one by one. The pressure meter can be transferred to the device. Thus, in cases where measurements need to be taken from many points, pressure effects at certain points can be measured quickly by simply rotating the plexiglass disk (6) in the middle section.

Fixation is ensured by passing the fixing nut (9) into the nut slot (10) located on the rear flange (8) and the front flange (2).

What is claimed is:

1. A multi-channel pressure scanning valve for pressure measurement, comprising:

pressure tubes wherein the pressure tubes are configured to transmit a pressure effect from pressure probes placed at points where pressure is to be measured, a front flange, wherein the pressure tubes are connected to the front flange, and the front flange is configured to enable pressure to be transmitted, a ball placed on a front face of the front flange, wherein the ball is configured to allow the pressure effect of the pressure tubes to be shifted by 90°, a ball spring positioned on the front face of the front flange, wherein the ball is configured to be positioned on the ball spring, pressure transmission channels on the front flange, wherein the pressure transmission channels are configured to transmit the pressure effect, a plexiglass disc rotatably mounted on the front flange, wherein by a rotating movement of the plexiglass disc, the plexiglass disc ensures that only the pressure effect from one pressure tube is transmitted, a pressure measurement tube on the plexiglass disc, wherein the pressure measurement tube is configured to allow the pressure to be transmitted to a pressure measurement device for measuring the pressure, a rear flange for fixing the front flange and the plexiglass disc, a nut connected to the rear flange and securing the rear flange, a nut slot located on the front flange and the rear flange, wherein the nuts is configured to be installed in the nut slot, a ball channel located on a lateral surface of the plexiglass disc, wherein the ball channel is configured to move as a result of the rotating movement, and a pressure measurement channel, wherein the pressure measurement tube located on the lateral surface of the plexiglass disc is connected to the pressure measurement channel.

* * * * *